United States Patent [19]

Sala

[11] Patent Number: 5,641,258
[45] Date of Patent: Jun. 24, 1997

[54] RECESSED SCREW HEAD

[76] Inventor: Carlo Sala, 101, Via Roma, 27025 Gambolo' (Pavia), Italy

[21] Appl. No.: 416,149

[22] Filed: Apr. 4, 1995

[30] Foreign Application Priority Data

Apr. 14, 1994 [IT] Italy ............................ MI94A0710

[51] Int. Cl.$^6$ ...................................... F16B 23/00
[52] U.S. Cl. ........................ 411/404; 411/402; 411/403
[58] Field of Search ...................... 411/402–404

[56] References Cited

U.S. PATENT DOCUMENTS

| | | | |
|---|---|---|---|
| 2,084,079 | 6/1937 | Clark | 411/403 |
| 2,285,460 | 6/1942 | Purtell | 411/404 |
| 3,295,572 | 1/1967 | Wing | 145/50 |
| 3,604,305 | 9/1971 | Dreger | 411/403 |
| 4,202,244 | 5/1980 | Gutshall | 411/404 |
| 4,384,812 | 5/1983 | Miyagawa | 411/403 |

FOREIGN PATENT DOCUMENTS

| | | |
|---|---|---|
| 0430563 | 6/1991 | European Pat. Off. . |
| 2202550 | 5/1974 | France . |
| 2469250 | 5/1981 | France . |
| 622862 | 4/1981 | Switzerland ............... 411/404 |
| 1006509 | 10/1965 | United Kingdom ............... 411/403 |
| 8908790 | 9/1989 | WIPO ............... 411/403 |
| 9112115 | 8/1991 | WIPO . |

*Primary Examiner*—Steven N. Meyers
*Assistant Examiner*—Tuyet-Phuong Pham
*Attorney, Agent, or Firm*—Steinberg, Raskin & Davidson, P.C.

[57] ABSTRACT

The screw, of the type provided with a coaxial recess adapted to mate with the tip of a screwing tool has in plan view a configuration in the overall form of a star with six chamfered points, with the lateral walls of the recess flared outwards and inclined to the screw axis by an angle of between 7 and 15 degrees. The sides of the chamfered points of the star consist of flat surfaces, pairs of which form on the lateral wall of the recess six corresponding ribs of isosceles triangle cross-section, the angle at the vertex of the isosceles triangle being substantially 90 degrees and the height of the triangle being substantially equal to one half the base length of said isosceles triangle. The screwing tool has a tip which mates with the lateral walls of the screw recess.

16 Claims, 2 Drawing Sheets

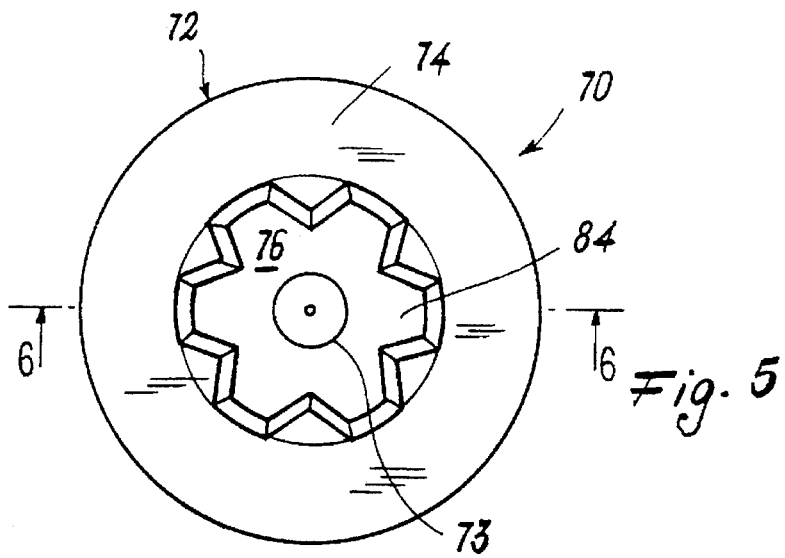
Fig. 5
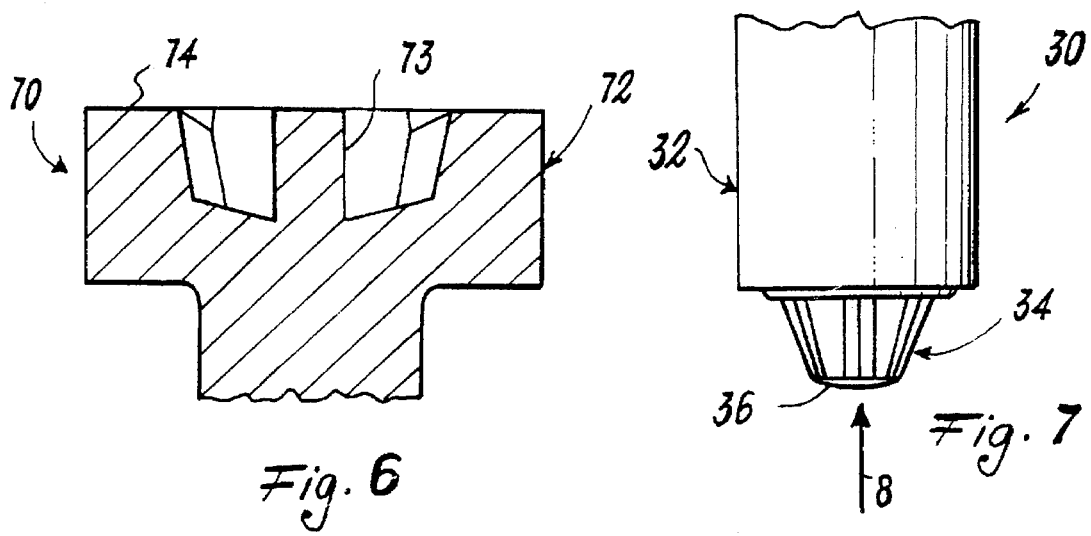
Fig. 6
Fig. 7
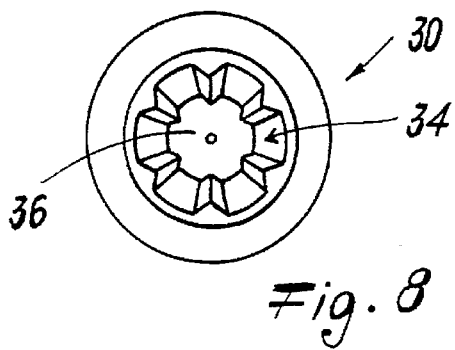
Fig. 8

RECESSED SCREW HEAD

FIELD OF THE INVENTION

This invention relates to a screw and a tool for screwing and unscrewing said screw, the screw being of the type provided with a coaxial recess in its head to mate with the tip of said tool, which for simplicity will be known hereinafter as the screwing tool.

BACKGROUND OF THE INVENTION

Screws of the aforesaid type have been known for some time, such as the classical screws with a cross recess known as "Philips" or "Pozidrive", and those known as "Torx" or "Tips". When produced on modern machines at a high production rate (up to 800 screws per minute), Philips and Pozidrive screws in particular, known for many decades, give rise to a series of problems due to the ease with which the equipment (punch) used to cold-form the recess in the screw head breaks, this resulting in considerable production slow-down.

After considerable study and experiment it has been concluded that this drawback is due particularly to the fact that the punch comprises fairly thin parts which easily break when the punch is subjected to the considerable number of blows per unit of time as required by current high-production machines. For similar reasons the tip of the relative screwdriver or screwing tool is subject to rapid wear, with the like possibility of breakage of some of its parts.

These known screws also suffer from the not inconsiderable drawback that a significant axial thrust has to be exerted by the relative screwdriver or motorized screwing tool when screwing them, in order to prevent the relative tip escaping from the recess in the screw. The axial thrust required for their screwing can even reach a level such as to deform the parts into which the screw is inserted if these are not sufficiently robust (for example in the case of laminations).

The Torx or Tips screws do not suffer from the drawback of escape of the screwing tip from the screw recess. In this respect such screws—the recess of which has an undulated star configuration in plan view—have the lateral wall of their recess formed by a cylindrical surface the directrix of which is of star shape and the generatrices are parallel to the screw axis. In addition the configuration of the recess—and hence of the punch used to form the recess, and of the appropriate screwing tool tip for the particular screw—is fairly solid, and hence able to resist the high working rate of currently available machines. However the relative punch is rather costly to construct because of its particular curved-surface configuration. In addition the fact that the recess is not flared complicates the cold-forming of the recess, to substantially reduce the number of screws obtainable per unit of time compared with the maximum number theoretically obtainable. The result is that the cost of such screws is considerably higher than that of screws with a traditional recess.

OBJECTS AND SUMMARY OF THE INVENTION

The object of the present invention is to obviate the drawbacks of known recessed screws by providing a screw which, although requiring only a small force for its screwing, can be produced at a rate per unit of time equal to the maximum obtainable by modern machines for cold-forming screws, and of which the recess is configured such that neither the punch for cold-forming the recess nor the tip of the relative screwing tool is subject to breakage, and both present a considerable wear resistance.

This object is attained by the recessed screw and the relative tool for screwing and unscrewing the screw in accordance with the present invention.

Specifically, said screw comprises a coaxial recess having in plan view a configuration in the overall form of a star with six chamfered points, with the lateral walls of the recess flared outwards, and is characterised in that the surfaces forming the lateral wall of the recess are inclined to the screw axis by an angle of between 7 and 15 degrees, the sides of the chamfered points of the star consisting of flat surfaces, pairs of which form on the lateral wall of the recess six corresponding ribs of isosceles triangle cross-section, the angle at the vertex of the isosceles triangle being substantially 90 degrees and the height of said triangle being substantially equal to one half the base length of said isosceles triangle.

A recess flare angle of between 7 and 15 degrees allows a high screw punching rate (the punch can be easily extracted from the formed recess), and also enables the screw to be screwed without exerting significant axial force on the screwing tool.

The screwing tool according to the invention is characterised by having a tip which mates with the lateral wall of the aforesaid screw.

To facilitate centering of the tip of the screwing tool within the screw recess, the end surface of the tip is shaped as a conical surface coaxial with the tip. For this reason the outer end surface of the ribs of triangular cross-section present on the inner wall of the recess lie on the same conical surface coaxial with the screw and with its vertex facing the screw point, the opening angle of this conical surface being greater than or equal to that of the conical surface of the end of the screwing tool. The base of the recess is shaped as a conical surface with its center on the screw axis and able to receive the conical end of the screwing tool.

In order to form a screw which cannot be tampered with or for other safety reasons, a coaxial peg can be provided on the base of the recess.

In this manner, if the tip of the screwing tool is not provided in its end surface with a coaxial hole to receive said peg, it will not be possible to use the said tool for unscrewing said screws.

BRIEF DESCRIPTION OF THE DRAWINGS

The invention will be more apparent from the ensuing description of some embodiments of a screw according to the invention and of a screwing tool also according to the invention. In this description reference is made to the accompanying drawings, in which:

FIG. 5 is a plan view from above of a third embodiment in which the anti-tamper or safety peg is provided;

FIG. 6 is a partial axial longitudinal section therethrough taken on the line 6—6 of FIG. 5;

FIG. 7 is a side view of the tip of the screwing tool according to the invention; and FIG. 8 is a view thereof in the direction of the arrow 8 of FIG. 7.

DETAILED DESCRIPTION OF THE INVENTION

Figure 1:
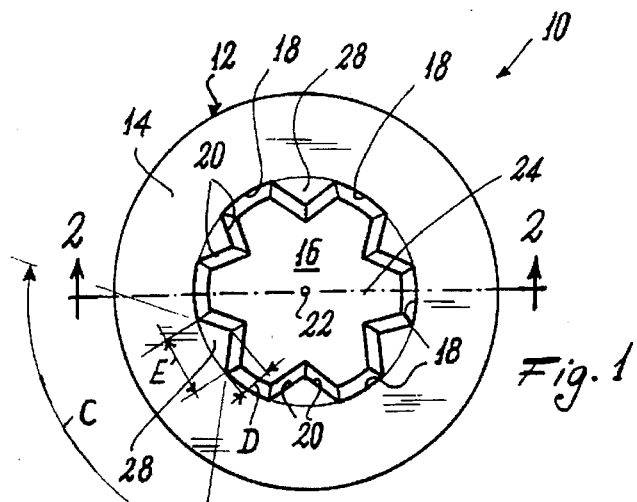
FIG. 1 is a plan view from above of a first embodiment of the screw.
Figure 2:
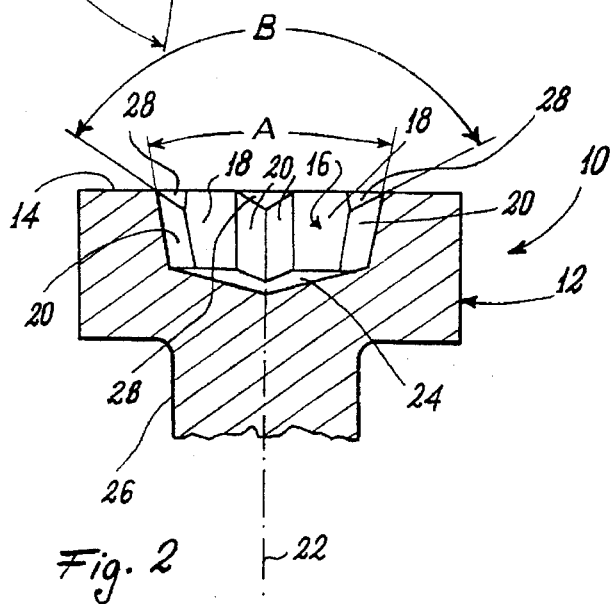
FIG. 2 is a partial axial longitudinal section therethrough taken on the line 2—2 of FIG. 1.

As can be seen from FIGS. 1 and 2, the screw 10 has an overall cylindrical head 12, in the upper face 14 of which there is provided a recess 16. It should be noted that the screw 10 (of which only the initial part of the shank 26 is visible in FIG. 2) differs from conventional screws only in the shape of the recess 16. This latter, when viewed in plan, has an overall six-point star configuration, the points being chamfered and rounded, the chamfers lying on a conical surface with its vertex on the axis of the screw 10 and its opening angle A of 20 degrees in this specific case, but which must not be less than 14 degrees and can be a maximum of 30 degrees, for the reasons which will be apparent hereinafter. Consequently the flat surfaces 18 of the lateral wall of the recess 16 are inclined to the axis 22 of the screw 10 by 10 degrees. The remaining flat surfaces 20 of the lateral wall of the recess 16—pairs of which form ribs of triangular cross-section projecting into the recess 16—are also inclined by 10 degrees to the axis 22 of the screw 10. The base 24 of the recess 16 is a coaxial conical surface 24 having an opening angle of 150 degrees.

To ensure that the punch (not shown) with which the recess 16 is made and the tip of the screwing tool are both sufficiently robust, a star configuration with six chamfered points is chosen for the recess 16, the sides 20 of the star points being flat surfaces, pairs of which form on the lateral wall of the recess 16 six angularly equidistant ribs of isosceles triangle cross-section, the two equal sides of the triangle being formed by the side surfaces 20. The angle C between each pair of side surfaces 20 is 90 degrees and the height D of the triangle is equal to one half the length of the triangle base E. This angle could also be slightly different from 90 degrees, but this would result in working complications which in practice compel the use of 90 degrees.

To achieve self-centering of the tip of the screwing tool (see the ensuing description of its tip), the upper end 28 of the triangular ribs formed by the pairs of flat side surfaces 20 lie on the same conical surface coaxial with the screw 10, this surface having an opening angle B (FIG. 2) of 150 degrees.

To obtain a screw such as that shown (10), the machine for producing it by cold forming must be provided with a punch which, following impact with the screw head, produces in it the recess 16. The recess is hence basically the impression left by said punch. For such a machine to be able to operate at its full capacity, it is essential that the opening angle A is not less than 14 degrees, otherwise the production rate will be slowed down because of a certain difficulty in extracting the punch.

On the other hand the opening angle A must not be greater than 30 degrees otherwise a significant axial force has to be applied by the screwdriver for screwing the screw, this (as stated) being what the present invention aims to avoid.

FIGS. 7 and 8 show part of the tip of a screwing tool 30. This tip 32, of overall cylindrical shape, has a male free end 34 shaped to mate with the lateral wall of the recess 16 of the screw 10. With regard to the screwing tool 30 it is not necessary to add any further description, except to state that the free end surface 36 of its tip 32 is conical, is coaxial with the tip and has an opening angle conveniently equal to that of the conical surface 24 of the base of the recess 16 of the screw 10, or in any event not less than that.

It is apparent that besides forming part of a screwdriver the rest of which is of conventional type, the tip 32 can be the interchangeable bit of a motorized screwdriver or of an electric drill also operating as a screwdriver.

Figure 3:
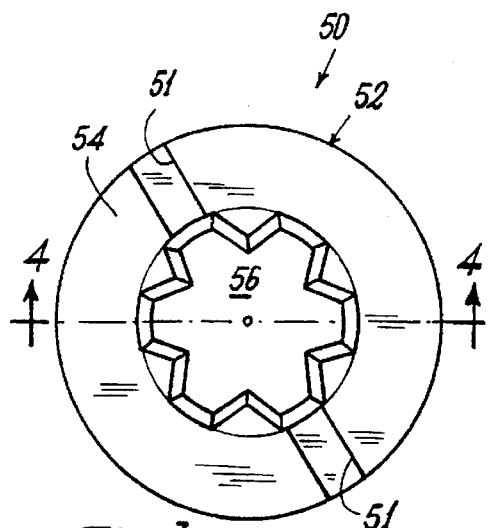
FIG. 3 is a plan view from above of a second embodiment in which the screw head is also provided with a slot of the type suitable for traditional screwdrivers.
Figure 4:
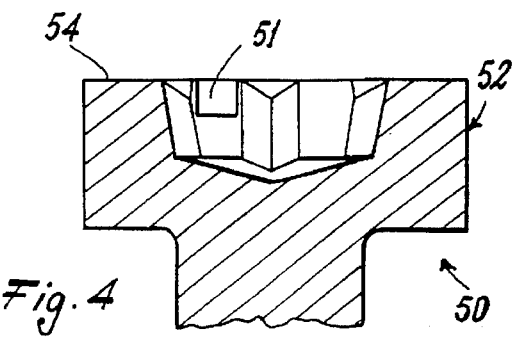
FIG. 4 is a partial axial longitudinal section therethrough taken on the line 4—4 of FIG. 3.

The only difference between the screw 50, shown in FIGS. 3 and 4, and the screw 10 of FIGS. 1 and 2 is the presence of two diametrically positioned slots 51 of suitable width provided in the upper face 54 of the head 52 which also includes a recess 56. This enables the screw 50 to be screwed and unscrewed with a conventional screwdriver if the screwing tool of the present invention is not available.

If, as a safety or anti-tamper measure, it is required to prevent the screw being unscrewed by a person not provided with a special screwing tool, the embodiment shown in FIGS. 5 and 6 and indicated by 70 can be used.

As can be seen, the only difference between the screw 70 and the screw 10 is that a coaxial peg 73 extends upwards from the base 84 of its recess 76. The recess 76 is formed in the upper face 74 of the cylindrical head 72 of the screw 70. Thus a person cannot unscrew the screw 70 unless provided with a screwing tool which in addition to being as shown (30) in FIGS. 7 and 8 also comprises in the center of the end surface 36 of its tip 32 a coaxial hole (not shown) able to receive the peg 73. The peg 73 can obviously be of different diameters or of different cross-section, so as to differentiate between, for example, screws used for different purposes, enabling these latter to be unscrewed only by a screwdriver or suitable tool which is not of general availability.

I claim:

1. In a screw including a substantially cylindrical head having a centrally arranged screw axis, and a coaxial recess arranged in said head to mate with a tip of a tool for screwing or unscrewing the screw, the improvement comprising the recess having in plan view a configuration of a star with six chamfered points such that flat surfaces are formed at each point, the recess being defined by said flat surfaces formed at each point and lateral walls arranged between said flat surfaces formed at each point, wherein the lateral walls and said flat surfaces formed at each point of the star are inclined outward in relation to the screw axis by an angle of between 7 and 15 degrees, pairs of said lateral walls forming six corresponding ribs of isosceles triangle cross-section such that an angle at a vertex of the isosceles triangle is substantially 90 degrees and a height of the isosceles triangle is substantially equal to one half a base length of said isosceles triangle, and wherein said recess is situated in a circular depression in said upper surface of said head, each of said ribs having an outer end surface defined between a periphery of said circular depression in said upper surface of said head and said lateral walls defining said rib, said outer end surfaces of all of said ribs being arranged to lie on a common conical surface which is coaxial with the screw and has a vertex facing a tip of the screw.

2. A screw as claimed in claim 1, wherein an opening angle of the common conical surface of said ribs is 150 degrees.

3. A screw as claimed in claim 1, wherein the recess has a base shaped as a conical surface coaxial with the screw and having a vertex facing a tip of the screw.

4. A screw as claimed in claim 3, wherein an opening angle of the conical surface of the base is 150 degrees.

5. A screw as claimed in claim 1, wherein said recess has a base, further comprising a substantially cylindrical peg arranged on the base of the screw recess and having a central axis coincident with the screw axis.

6. A screw as claimed in claim 1, further comprising two diametrical slots arranged in said upper surface of said head, said slots adapted to be engaged by a traditional screwing tool.

7. The screw of claim 1, wherein said recess has a base and said flat surfaces formed at each point of the star and said lateral walls have a uniform slope along their entire length.

8. A screw, comprising a substantially cylindrical head having a screw axis and an upper surface, and a recess arranged in said upper surface of said head, said recess having in plan view a configuration of a six-pointed star, each of said points of said star being chamfered such that a flat surface is formed, said recess being defined by said flat surfaces at said points of said star and lateral walls situated adjacent to and between said points of said star, said lateral walls and said flat surfaces of said points of said star being flared outward and inclined in relation to the screw axis by an angle of between 7 and 15 degrees, said lateral walls situated between said points of said star forming six corresponding ribs having an isosceles triangle cross-section whereby each of said ribs is formed by a respective pair of said lateral walls between adjacent ones of said points of said star, a vertex angle of said triangle being substantially 90 degrees and a height of said triangle being substantially equal to one-half a base length of said triangle.

wherein said recess is situated in a circular depression in said upper surface of said head, each of said ribs having an outer end surface defined between a periphery of said circular depression in said upper surface of said head and said lateral walls defining said rib, said outer end surfaces of all of said ribs being arranged to lie on a common conical surface which is coaxial with the screw and has a vertex facing a tip of the screw.

9. The screw of claim 8, wherein an opening angle of said common conical surface is 150 degrees.

10. The screw of claim 8, wherein said recess has a base shaped as a conical surface which is coaxial with the screw and has a vertex facing the tip of the screw.

11. The screw of claim 10, wherein an opening angle of said conical surface of said base of said recess is 150 degrees.

12. The screw of claim 8, wherein said recess has a base, further comprising a cylindrical peg situated on said base within said recess, said peg having a central axis coincident with the screw axis.

13. The screw of claim 12, wherein said peg is solid and has an upper surface coplanar with said upper surface of said head.

14. The screw of claim 8, wherein said head further comprising two diametrical slots in said upper surface of said head, said slots being adapted to be engaged by a traditional screwing tool.

15. The screw of claim 8, wherein said recess has a base and said flat surfaces formed at each point of the star and said lateral walls having a uniform slope.

16. The screw of claim 15, wherein said flat surfaces formed at each point of the star have a uniform slope from said base to said upper surface in said head.

* * * * *